US006625015B2

(12) United States Patent
Yin

(10) Patent No.: US 6,625,015 B2
(45) Date of Patent: Sep. 23, 2003

(54) PORTABLE COMPUTER DOCKING TRAY SYSTEM

(75) Inventor: Memphis Zhihong Yin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 32 days.

(21) Appl. No.: 10/085,450

(22) Filed: Feb. 27, 2002

(65) Prior Publication Data

US 2003/0161096 A1 Aug. 28, 2003

(51) Int. Cl.[7] .................................................. H01R 13/44
(52) U.S. Cl. ....................... 361/686; 361/724; 439/352; 710/101
(58) Field of Search .............................. 361/684, 687, 361/724–727; 439/347, 352, 131, 132, 374, 127; 429/127; 320/113; 364/708.4; 710/101–103

(56) References Cited

U.S. PATENT DOCUMENTS

| 6,040,681 | A | | 3/2000 | May ............................ 320/113 |
|---|---|---|---|---|
| 6,072,695 | A | * | 6/2000 | Steiger et al. ............... 361/686 |
| 6,080,508 | A | | 6/2000 | Dasgupta et al. ............ 429/127 |
| 6,091,602 | A | | 7/2000 | Helot ....................... 364/708.4 |
| 6,119,184 | A | * | 9/2000 | Takahama .................... 710/101 |
| 6,185,095 | B1 | | 2/2001 | Helot et al. ................. 361/686 |
| 6,220,883 | B1 | * | 4/2001 | Helot et al. .................. 439/341 |
| 6,231,371 | B1 | | 5/2001 | Helot .......................... 439/374 |
| 6,259,601 | B1 | * | 7/2001 | Jaggers et al. ............... 361/690 |
| 6,297,953 | B1 | | 10/2001 | Helot ......................... 361/686 |
| 6,301,106 | B1 | | 10/2001 | Helot et al. ................. 361/686 |
| 6,309,230 | B2 | | 10/2001 | Helot .......................... 439/131 |
| 2002/0159231 | A1 | * | 10/2002 | Nguyen et al. ............. 361/686 |

OTHER PUBLICATIONS

Author Unknown, "Pow erpad160" Marketing Brochure, Electrofuel Corporation, Mississauga, Ontario, Canada (2 Pages), Date Unknown.

Yu Kun–ha; Korea Herald New spaper; Press Release "Super Lithium Polymer Battery" Korea Institute of Science and Technology ("KIST") in conjunction with Kokam Engineering Co. Ltd. Jul. 21, 1998. Information obtained from Internet web page www.dynamixcosmo.com/battery.html (last updated on Sep. 13, 2000) (11 pages).

Author Unknown; "Advanced Lithium Batteries" Lithium Technology Corporation. Information obtained from Internet web page www.lithiumtech.com/techover.htm (publication data unknow n) (4 pages).

* cited by examiner

Primary Examiner—Darren Schuberg
Assistant Examiner—Hung Van Duong

(57) ABSTRACT

A portable computer docking tray system with a docking tray for facilitating securing a portable computer to a docking station. The docking tray is also serves as a compact and light-weight auxiliary power source for the portable computer that may be transported with the portable computer.

20 Claims, 3 Drawing Sheets

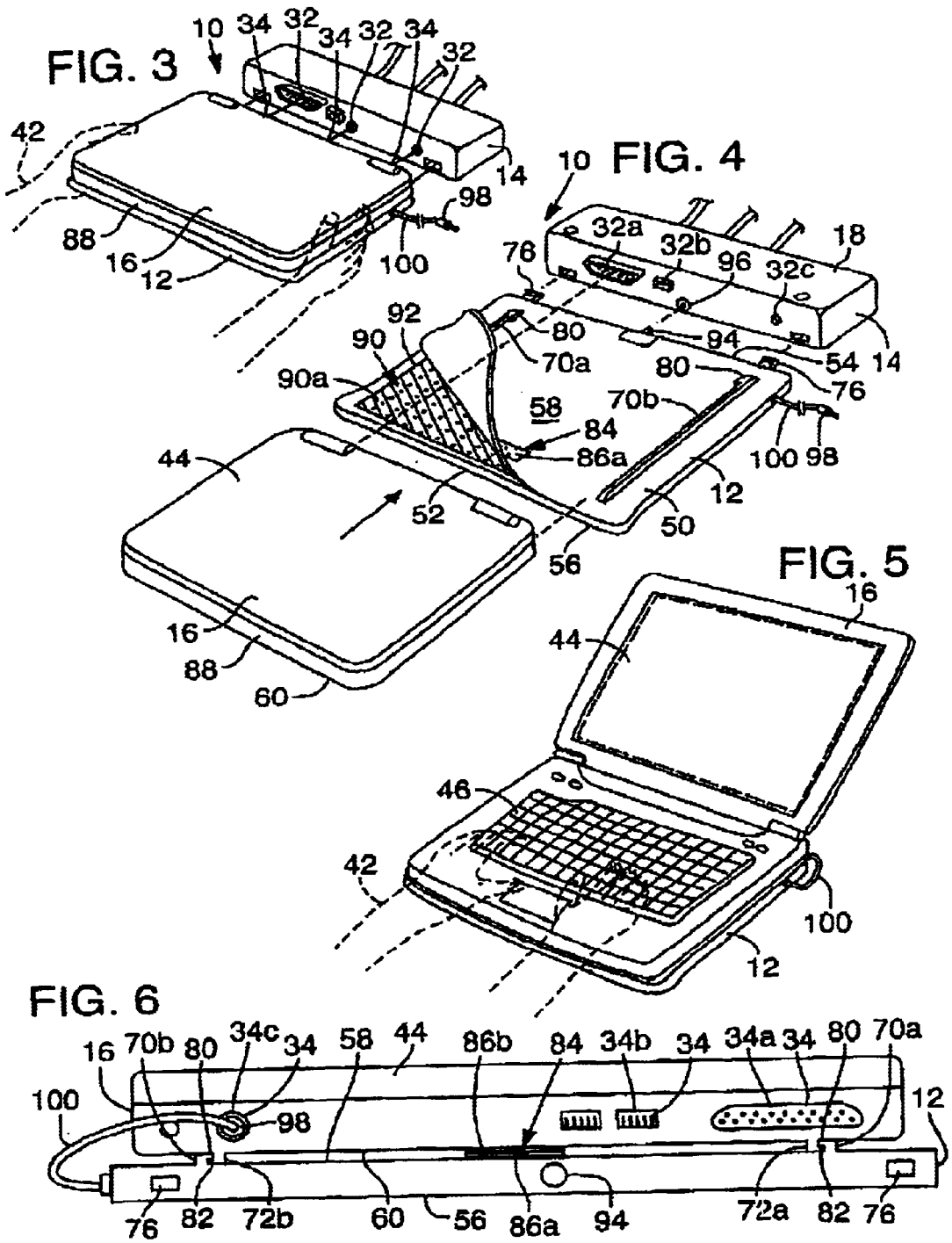

PORTABLE COMPUTER DOCKING TRAY SYSTEM

TECHNICAL FIELD

This invention relates to a portable computer docking tray system.

BACKGROUND OF THE INVENTION

Portable computers, which include a type commonly known as "notebook computers," are compact, light-weight, and portable computing devices with substantial computing power, and they are gaining in popularity. As a result, a large variety of portable computer accessories are also entering the market. One of these accessories is commonly known as a docking station, which allows the portable computer to easily connect with fixed computer components thereby allowing it to operate as a conventional personal computer. Another of these accessories is an auxiliary battery, which increases the additional stored power of the portable computer. Both of these accessories are discussed in greater detail below.

A. Docking Station

The typical docking station is positioned on a table or desk and includes a base which is connected to several fixed computing components and peripherals such as a keyboard, printer, mouse, power source, monitor and in many circumstances, a computer network. The base includes docking connectors positioned to detachably secure a portable computer therein. When the portable computer is connected to the docking station, the fixed computer components and peripherals operate the portable computer. Accordingly, the portable computer has all the traditional conveniences of a desktop computer, such as a larger monitor and keyboard and direct access to a local or global computing network. In addition, the docking station can also be used to charge the portable computer's internal battery.

Most computer docking stations are designed to minimize the amount of desk space they occupy. For example, some docking stations rest on a desk underneath a stand supporting the fixed monitor. To connect the portable computer to the docking station, the computer user rests the portable computer on the desk in front of the fixed monitor, then slides the portable computer under the monitor until the docking connectors of the portable computer connect with mating connectors on the docking station. Proper connection of these connectors requires them to be properly aligned with each other prior to their connection.

One known device for ensuring the connectors are properly aligned prior to connection is to include a docking tray adjacent to the docking station. The tray usually includes slots that operably engage appropriately aligned protrusions extending from the bottom surface of the portable computer. Accordingly, the computer user positions the portable computer on the docking tray such that the protrusions engage the slots on the docking tray. In this configuration, the connectors on the docking tray and mating connectors on the portable computer are properly aligned. Then, the computer user slides the portable computer on the tray and toward the docking station, thereby connecting the portable computer to the docking tray.

These types of docking tray systems have several limitations. For example, they occupy a large amount of space on the desk when they are not in use. Similarly, aside from facilitating proper alignment of the personal computer with the docking station, they offer few other benefits.

B. Auxiliary Battery

Battery technology is evolving to reduce the battery's weight and size, while increasing its stored power. Accordingly, some auxiliary batteries are now light-weight and compact enough to be carried with a portable computer, thereby significantly increasing the portable computer's available stored power over that offered only by the portable computer's internal battery. These auxiliary batteries are typically connected to the power connector on the portable computer.

Despite the benefits offered by known auxiliary batteries, the have several drawbacks. For example, they must be periodically recharged, and they usually occupy a significant amount of desk space while they are being recharged. In addition, since the personal computer and auxiliary battery are separate components that are electrically connected to each other, in some situations there is a tendency for them to move independently of each other. Such independent movement can lead to the two components becoming inadvertently disconnected from each other, or even to one or both of the components being damaged. For example, if a person using the portable computer with a conventional auxiliary battery attached is traveling in an airplane that encounters turbulence, the computer user may remember to hold their personal computer, thereby protecting it from damage. But he or she may forget that the auxiliary battery is attached and neglect to also hold the battery during the turbulence. Accordingly, the auxiliary battery could fall and possibly damage itself or injure someone.

SUMMARY OF THE INVENTION

Accordingly, despite the known portable computer docking stations and auxiliary batteries, there remains a need for a docking station system that has a docking tray that does not occupy desk space when not in use and that offers more benefits than simply guiding the portable computer into the docking station. Similarly, there remains a need for an auxiliary battery that does not occupy significant desk space while being recharged, and that is easy and convenient to carry and use with a portable computer. In addition to other benefits that will become apparent in the following disclosure, the present invention fulfills these needs.

The present invention is a docking tray system for securing a portable computer to a docking station that has a docking tray detachably secured to the docking station. The docking tray also serves as a light-weight and portable auxiliary battery for the portable computer.

BRIEF DESCRIPTION OF THE DRAWINGS

FIG. 3 is an isometric view of the portable computer docking tray system of FIG. 1 showing a portable computer and docking tray being detached from a docking station.

FIG. 4 is an exploded and partially fragmentary isometric view of the docking tray system of FIG. 1.

FIG. 5 is an isometric view of the portable computer and docking tray of FIG. 3 showing a possible orientation of these components.

FIG. 6 is a back view of the portable computer and docking tray of FIG. 3.

DETAILED DESCRIPTION

A docking tray system 10 (FIGS. 1–6), 10' (FIGS. 7–10) with a docking tray 12 (FIGS. 1–6), 12' (FIGS. 7–10) detachably secured to a docking station 14 (FIGS. 1–4), 14' (FIGS. 7–9), and wherein the docking tray 12, 12' also serves as a light-weight and portable auxiliary power source for a portable computer 16 is disclosed in FIGS. 1–10.

A. Docking Station

Figure 1:
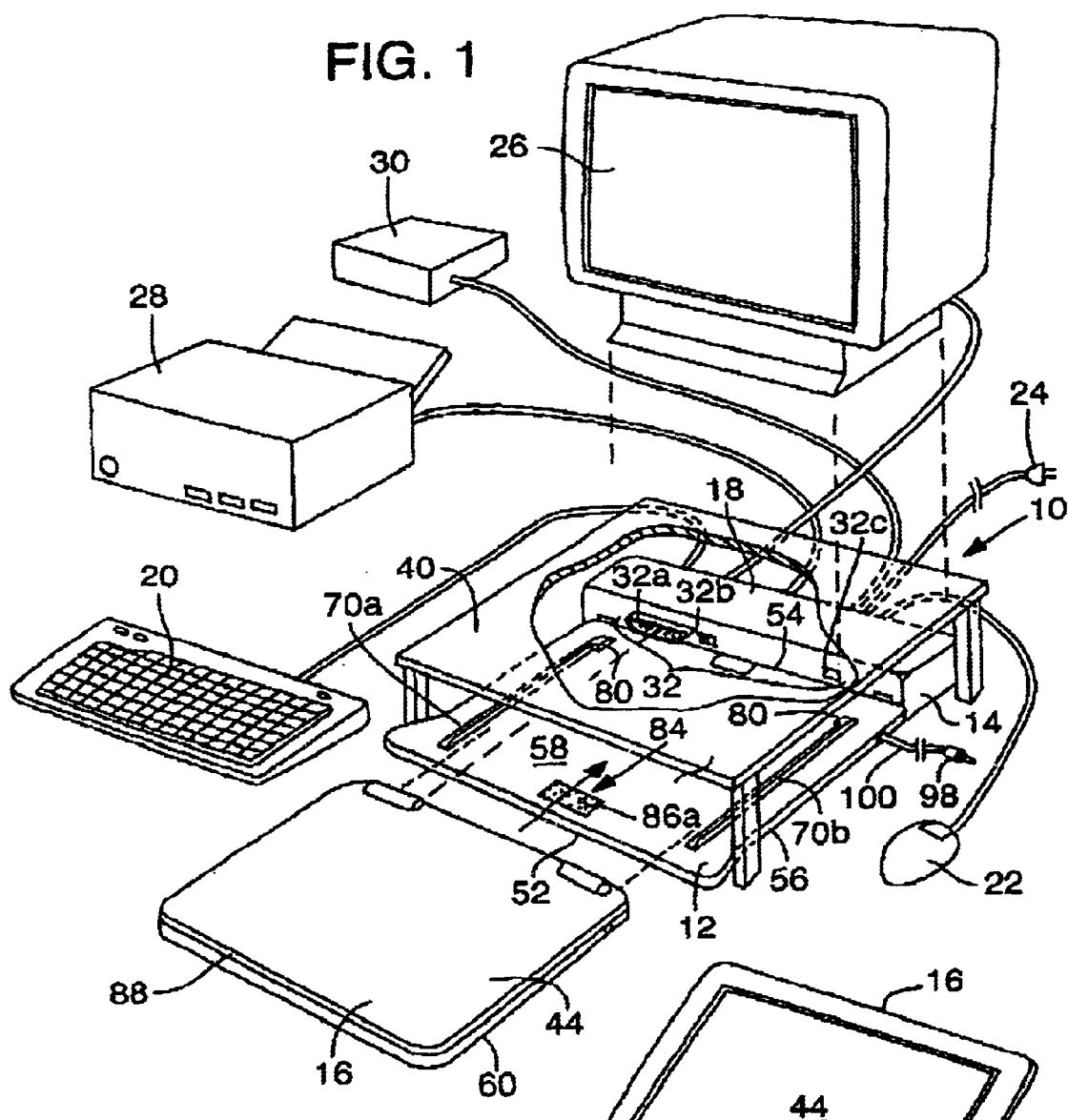
FIG. 1 is an isometric view of a portable computer docking tray system in accordance with an embodiment of the present invention and also showing a possible configuration of related computing components and peripherals.

As best shown in FIG. 1, the docking station 14 has a base 18 that usually rests on a desk or the like. The base 18 is operably connected to one or more fixed computing components and peripherals such as a keyboard 20, mouse 22, power source 24, monitor 26, printer 28 and computer network 30. The base 18 includes docking connectors 32, such as printer connector 32a, universal serial bus connector 32b, and power supply connector 32c positioned to detachably and operably secure respective mating connectors 34a–b, respectively, on the portable computer 16.

When the portable computer 16 is connected to the docking station 14, the fixed computer components and peripherals operate with the portable computer 16. Accordingly, the portable computer 16 has all the traditional conveniences of a desktop computer, such as an auxiliary monitor 26 and keyboard 20 and direct access to a local or global computer network 30.

In order to maximize the available desk space, the docking station 14 is usually positioned beneath a monitor stand 40 supporting the auxiliary monitor 26 as shown in FIG. 1. The docking tray 12 is operably secured to the docking station 14, and usually below the monitor stand 40, such that the docking tray 12 facilitates and aligns the docking connectors 32 on the portable computer with their respective mating connectors 34 on the docking station.

In addition, the docking station 14 can also be used to charge the portable computer's internal battery (not shown). These types of docking stations are commercially available. For example, the Hewlett-Packard Corporation of Palo Alto, Calif. manufactures and sells such a computer docking station under the trademark HP PAVILLION N5000 SERIES NOTEBOOK REPLICATOR.

Figure 2:
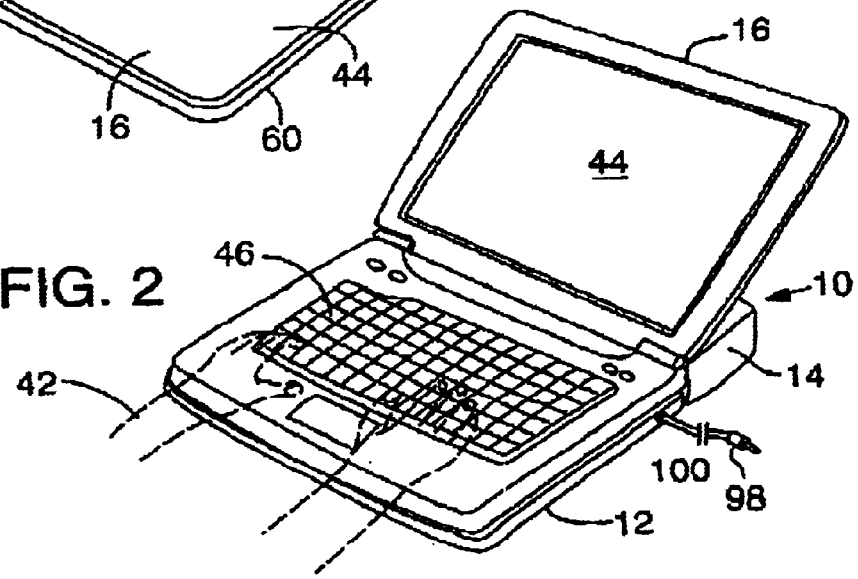
FIG. 2 is an isometric view the portable computer docking tray system of FIG. 1 showing another possible configuration of related computing components.

Alternatively, and as best shown in FIG. 2, the docking station 14 may still allow the computer user 42 to use the display 44, keyboard 46 and other input devices on the portable computer 16. In such a configuration, the docking station 14 serves to provide a permanent source of power to the portable computer 16 and connect the portable computer 16 to a local or global computer network 30.

B. Docking Tray

As best shown in FIG. 4, the docking tray 12 is a substantially planar base 50 that preferably has overall dimensions (length and width) approximately similar to the length and width of the portable computer 16. The docking tray 12 preferably has a front edge 52, back edge 54, lower surface 56, which is configured to rest on the desktop, and an upper surface 58, which is adapted to slidably engage the lower side 60 of the portable computer 16.

Preferably, the upper surface 58 includes appropriate surface indentations or protrusions 70 for operably engaging mating protrusions or indentations 72 on the portable computer 16. For example, as best shown in FIG. 1, the upper surface 58 of the docking tray 12 preferably includes left and right rails 70a, 70b, respectively, spaced apart from each other and extending from the front edge 52 to the back edge 54 of the docking tray 12. As shown in FIG. 6, protrusions 72, such as legs 72a, 72b, respectively, extend from the lower surface 56 of the portable computer 16 and operably engage the rails 70a, 70b, respectively, on the docking tray 12, such that the portable computer 16 slides easily on the docking tray 12 toward the docking station 14. The rails 70a, 70b and legs 72, 72b, respectively, are positioned so as to align the docking connectors 32 on the docking station 14 with the mating connectors 34 on the portable computer 16.

Preferably, the docking tray 12 is detachably secured to the docking station 14 with conventional connectors. For example, hooks 76 extending from the back edge 54 of the docking tray 12 can operably engage pins (not shown) on or in the docking station 14 thereby securing the docking tray 12 to the docking station 14. A conventional latching mechanism (not shown) can deflect the pins from their engagement with the hooks 76 when a lever or similar handle is moved by the computer user, thereby easily disconnecting the docking tray 12 from the docking station 14.

More preferably, the docking tray 12 is also detachably secured to the portable computer 16. One known structure for detachably securing these components together is best shown in FIGS. 1 and 6. Protrusions or lips 80 extend from the rails near the back edge of the docking tray to operably engage notches 82 (FIG. 6) in the legs 72a, 72b of the portable computer 16. A securing element 84, such as conventional hook and loop material 86a is secured to the upper surface 58 of the docking tray 12 toward the front edge 52 of the docking tray 12. Appropriately engaging hook and loop material 86b is also secured to the lower side 60 of the portable computer 16 to engage the hook and loop material 86a on the docking tray 12 when the portable computer 16 is properly seated on the docking tray 12 as shown in FIGS. 3 and 6.

A computer user 42 (FIG. 5) secures the portable computer 16 to the docking tray 12 simply by positioning the legs 72a, 72b of the portable computer 16 adjacent to the rails 70a, 70b on the docking tray 12 and sliding the portable computer 16 toward the docking station 14. When the portable computer 16 is properly seated on the docking tray 12, the notches 82 in the legs 72a, 72b engage the lips 80 on the rails, and the user press down on the portable computer 16 so that the engaging hook and loop material 86b on the portable computer 16 operably engages the hook and loop material 86a on the docking tray 12. To detach these components from each other, the computer user simply reverses this process. First lifting the front end 88 of the portable computer 16 to detach the engaging hook and loop material 86b from the hook and loop material 86a on the docking tray 12, then sliding the portable computer 16 away from the docking station 14 to disengage the notches 82 in the legs 72a, 72b from the lips 80 on the rails 70a, 70b.

Preferably, the docking tray 12 includes a source of stored power 90, such as a battery 90a or fuel cell, received in a chamber 92 within the docking tray 12 as best shown in FIG. 4. More preferably, the source of stored power 90 is a light-weight battery 90a with a high energy density. At least two types of batteries having these properties are commercially available. One type of battery is commonly known as a Lithium-Ion Polymer battery. The other type of battery is known as an Advanced Lithium Battery ("ALB"). Because of their construction, both of these types of batteries can be formed into a substantially rectangular flat-plate that allow them to be carried easily with a portable computer in a traditional portable computer carrier. One known manufacturer of such flat plate lithium polymer auxiliary batteries is the Electrofuel Corporation of Mississauga, Ontario, Canada, which sells them under the trademarks POWER-PAD 120 and POWERPAD 160. The Toshiba Corporation of Tokyo, Japan is one known manufacturer of ALB batteries.

Preferably the docking tray 12 is in electrical communication with the docking station 14 when secured to the docking station 14, thereby allowing the battery 90a of the docking tray 12 to be recharged when the docking tray 12 is connected to the docking station 14. As best shown in FIG. 4, one known structure for placing the battery 90a in electrical communication with the docking station 14 includes extending an electrical plug 94 from the docking tray 12 so that it is received within an appropriate power connector 96 on the docking station 14 when the docking tray 12 is secured to the docking station 14. The electrical plug 94 is operably connected to the battery 90a, and the power connector 96 is operably connected to an outside power source such that the battery 90a is charged when the electrical plug 94 is received within the power connector 96.

Similarly, a power plug 98 and related cable 100 that are in electrical communication with the battery 90a extends from the docking tray 12 as best shown in FIG. 4. The power plug 98 is detachably received within the power supply connector 32c on the portable computer 16. Accordingly, when the portable computer 16 and docking tray 12 are disconnected from the docking station 14, the power plug 98 from the docking tray 12 can be connected to the power supply connector 32c on the portable computer 16, thereby powering the portable computer 16 through the battery 90a within the docking tray 12. Moreover, since the docking tray 12 may be detachably secured to the portable computer 16 as previously described, risk of electrical disconnection from and damage to these components caused by inadvertent separation of them from each other is reduced.

C. Power Adapter

As shown in FIGS. 7–10, the docking tray 12' of the present invention can be readily adapted to connect with an existing power connector 96 on a conventional docking station 14' while also allowing the portable computer 16 to connect with that same power connector 96.

In this embodiment, the docking tray 12' includes a source of stored power 90 and like numbered elements of docking tray 12 (FIG. 4) of the previous embodiment. In addition, a power adapter 110 extends between the docking station 14' and the docking tray 12' with the portable computer 16 resting thereon. The side of the power adapter adjacent to the docking station 14' includes a power connector 112 for operably engaging the power connector 96 on the docking station 14'. The opposite side of the power adapter, which is positioned adjacent to the portable computer 16 and docking tray 12', includes power connectors 114, 116, respectively for operably engaging the respective power connectors on the portable computer 16 and docking tray 12'. Power connectors 112, 114, and 116 of the power adapter 110 are in electrical communication which each other, such that power provided by the docking station 14' is transferred through power connector 96 to the power adapter 110, which then provides this power to both the portable computer 16 and the source of stored power 90 in the docking tray 12'. Accordingly, the source of stored power 90 in the docking tray 12' can be recharged simultaneously while the portable computer 16 is being powered by the docking station 14'.

Figure 7:
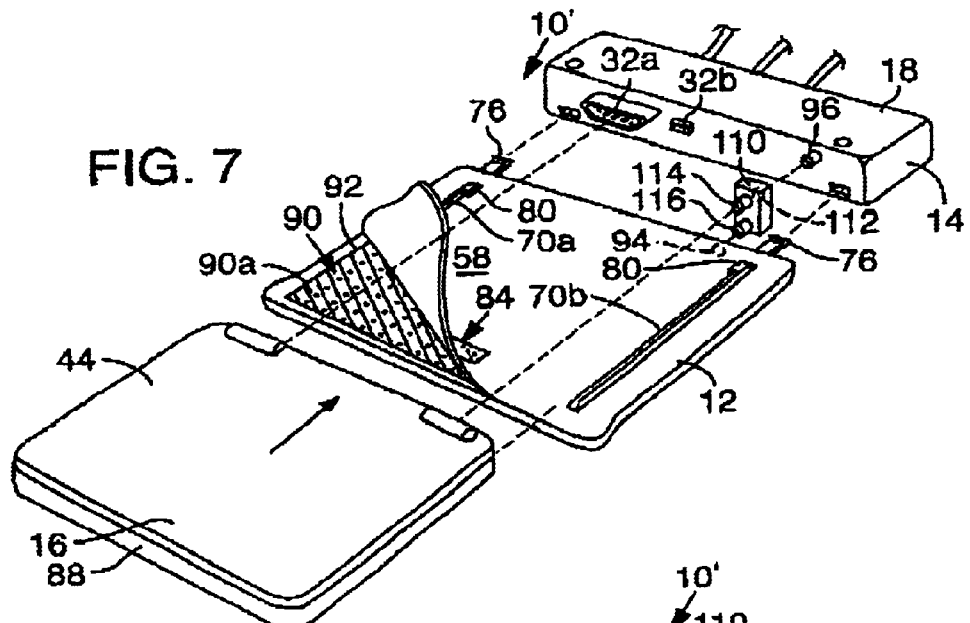
FIG. 7 is an exploded and partially fragmentary isometric view of a docking tray system in accordance with an alternative embodiment of the present invention showing a portable computer and docking tray being detachably secured to a docking station with a power adapter electrically connecting the portable computer and docking tray to the docking station.
Figure 8:
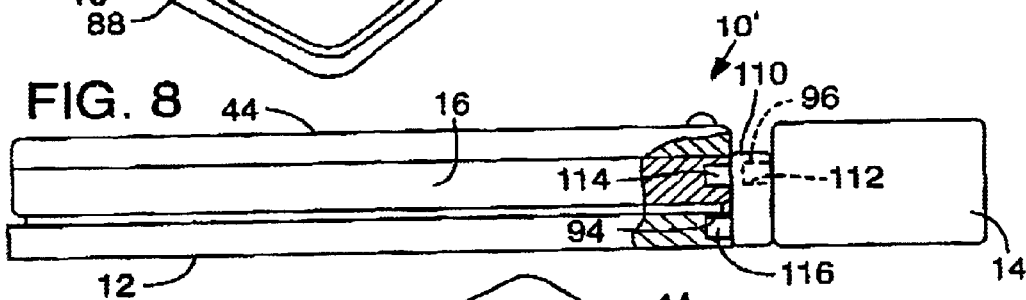
FIG. 8 is a side view of the docking tray system of FIG. 7.
Figure 9:
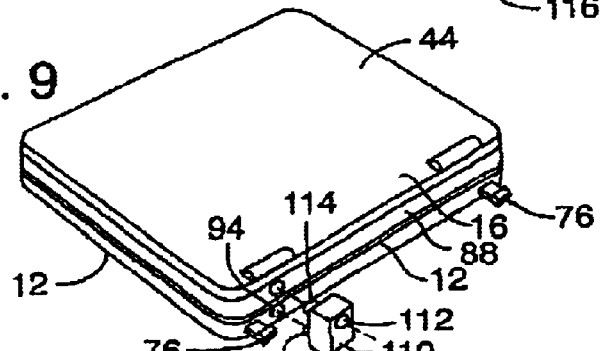
FIG. 9 is an exploded, isometric, back view of the portable computer, docking tray, and power adapter of FIG. 7.

The docking tray 12' is preferably detachably secured to the docking station 14' such as with the hooks 76 of the previous embodiment. However, in order to accommodate the power adapter as described, the length of these hooks 76 is preferably increased by the thickness of the power adapter 110 as best shown in FIG. 7.

Figure 10:
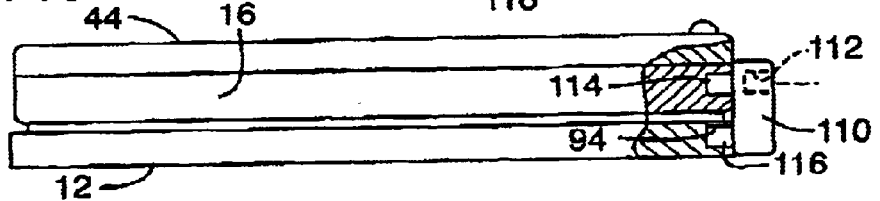
FIG. 10 is a side view of the portable computer, docking tray and power adapter of FIG. 9.

Preferably, the power adapter is detachably secured to the docking station 14', portable computer 16, and docking tray 12'. Accordingly, when detached from the docking station 14', but still connected to both the portable computer and docking tray as shown in FIG. 10, the power adapter 110 can also be used to transfer power from the source of stored power 90 in the docking tray 12' to the portable computer 16. Accordingly, the docking tray need not include the separate power plug 98 and related cable 100 of the previously docking tray 12 shown in FIGS. 4 and 5.

The power adapter 110 allows the docking tray 14' to be easily retrofit with existing docking stations 14'. Accordingly, a computer user with an existing docking station can obtain the benefits of the present invention simply by replacing their existing docking tray with the docking tray 14' and power adapter 110 of the present invention.

D. Alternative Embodiments

Having here described preferred embodiments of the present invention, it is anticipated that other modifications may be made thereto within the scope of the invention by individuals skilled in the art. For example, the preferred embodiment of the present invention discloses the position of the power connectors and the like as being on the back side of the portable computer. In practice, these connectors are actually positioned on any side of the portable computer, including the left, right, and lower sides of portable computer. In such case, the relative position of the mating connectors on the docketing tray and docking station can be readily modified to accommodate the portable computer without deviating from the scope of the present invention. Thus, although preferred and alternative embodiments of the present invention have been described, it will be appreciated that the spirit and scope of the invention is not limited to those embodiments, but extend to the various modifications and equivalents as defined in the appended claims.

What is claimed is:

1. A portable computer docking tray for a docking station, said docking tray having:
   a chamber;
   a portable source of power received within said chamber;
   a surface for operably positioning the portable computer in a predefined position with respect to the docking station and maintaining this predefined position as a portable computer is moved toward the docking station so that at least one connector on the docking station operably engages a mating connector on the portable computer; and, a power connector for connecting the portable source of power to the portable computer thereby powering the portable computer, wherein the docking tray and docking station are separable such that the docking tray also serves as an auxiliary power source for the portable computer when not connected to the docking station.

2. The portable computer docking tray for a docking station of claim 1, wherein the docking tray is detachably secured to the docking station.

3. The portable computer docking tray for a docking station of claim 1, wherein the docking tray is detachably secured to the portable computer.

4. The portable computer docking tray for a docking station of claim 1, wherein said surface includes a plurality of rails substantially parallel to each other and spaced apart from each other and for operably engaging protrusions extending from a lower surface of the portable computer.

5. The portable computer docking tray for a docking station of claim 1, wherein said docking tray is a substantially flat plate, and said surface is an upper surface of the docking tray.

6. The portable computer docking tray for a docking station of claim 1, wherein said portable source of power is a battery.

7. The portable computer docking tray for a docking station of claim 1, wherein the docking station is in electrical communication with a power source, and further including a power connector operably engaging a mating power connector on said docking station such that the portable source of power is recharged when the docking tray is connected to the docking station.

8. The portable computer docking tray for a docking station of claim 2, wherein said docking tray is detachably secured to said docking station with hooks extending from one of said docking tray and docking station.

9. The portable computer docking tray for a docking station of claim 4, wherein said protrusions include a notch and said rails include a lip positioned toward one end of the docking tray such that the notch engages the lip to detachably secure the computer docking tray to the portable computer.

10. The portable computer docking tray for a docking station of claim 6, wherein said battery is a lithium-ion polymer battery.

11. The portable computer docking tray for a docking station of claim 7, wherein said mating power connector operably engages said power connector on said docking tray and a power connector on said portable computer.

12. The portable computer docking tray for a docking station of claim 7, further including a power adapter operably engaging said mating power connector, said power connector on said docking tray, and a power connector on said portable computer, such that power from the docking station simultaneously provides power to said portable computer and said portable source of power in said docking tray.

13. The portable computer docking tray for a docking station of claim 12, wherein said power adapter is detachably secured to said docking station, and said portable source of power powers said portable computer when said power adapter is detached from said docking station and operably engaged with said power connector on the docking tray and said power connector on the portable computer.

14. A portable computer docking station system for operably connecting a portable computer to at least one computer peripheral comprising:

a docking station operably connected to a power source and the at least one computer peripheral, said docking station having at least one connector for operably engaging a mating connector on the portable computer;

a substantially planar docking tray detachably secured to said docking station;

a portable source of power secured to said substantially planar docking tray;

a power connector for connecting the portable source of power to the portable computer thereby powering the portable computer wherein the docking tray also serves as an auxiliary power source for the portable computer when the docking tray is not connected to the docking station.

15. The portable computer docking station system of claim 14, wherein said portable source of power is a battery.

16. The portable computer docking station system of claim 14, wherein the docking station is in electrical communication with a power source, and further including a power connector operably engaging said docking station such that the portable source of power is recharged when the docking tray is connected to the docking station.

17. A portable power system for powering a portable computer and guiding the portable computer to connect with a docking station, said portable power system comprising:

a frame having a connector for detachably securing the frame to the docking station and a surface for operably engaging the portable computer to guide it in a predefined path toward the docking station;

a portable source of power operably secured to said frame; and, a power connector for connecting the portable source of power to the portable computer thereby powering the portable computer.

18. The portable power system for powering a portable computer and guiding the portable computer to connect with a docking station of claim 17, wherein the portable source of power is a battery selected from the group consisting of a lithium-ion polymer battery and an advanced lithium battery.

19. The portable power system for powering a portable computer and guiding the portable computer to connect with a docking station of claim 17, wherein the frame is detachably secured to the portable computer.

20. The portable power system for powering a portable computer and guiding the portable computer to connect with a docking station of claim 19, wherein said frame is detachably secured to the portable computer with hook and loop material.

* * * * *